United States Patent
D'Souza et al.

(10) Patent No.: US 12,463,528 B2
(45) Date of Patent: Nov. 4, 2025

(54) HANDLING CONNECTION FAULTS OF A BOOTSTRAP CAPACITOR IN A SWITCHING CONVERTER

(71) Applicant: Shaoxing Yuanfang Semiconductor Co., Ltd., Shaoxing (CN)

(72) Inventors: Arnold J D'Souza, Bangalore (IN); Shyam Somayajula, Bangalore (IN)

(73) Assignee: Shaoxing Yuanfang Semiconductor Co., Ltd., Zhejiang (CN)

( * ) Notice: Subject to any disclaimer, the term of this patent is extended or adjusted under 35 U.S.C. 154(b) by 235 days.

(21) Appl. No.: 18/360,881

(22) Filed: Jul. 28, 2023

(65) Prior Publication Data

US 2024/0128856 A1 Apr. 18, 2024

(30) Foreign Application Priority Data

Oct. 14, 2022 (IN) .............................. 202241058855

(51) Int. Cl.
*H02M 1/32* (2007.01)
*H02M 3/156* (2006.01)

(52) U.S. Cl.
CPC ........... *H02M 1/325* (2021.05); *H02M 3/156* (2013.01)

(58) Field of Classification Search
CPC .... H02M 3/156; H02M 3/155; H02M 3/1552; H02M 3/1555; H02M 3/1557; H02M 3/157; H02M 3/158; H02M 3/1582; H02M 3/1584; H02M 1/325; H02M 1/38; H02M 1/385; H02M 1/32; H02M 1/322
See application file for complete search history.

(56) References Cited

U.S. PATENT DOCUMENTS

| | | |
|---|---|---|
| 6,714,067 B1 | 3/2004 | Farrenkopf |
| 6,836,173 B1 | 12/2004 | Yang |
| 8,901,912 B2 | 12/2014 | Lee et al. |
| 9,350,241 B2 | 5/2016 | Chang et al. |
| 10,669,964 B2 | 6/2020 | Nagata |
| 2003/0002352 A1 | 1/2003 | Kim |
| 2005/0116748 A1 | 6/2005 | Deppe |
| 2005/0225259 A1* | 10/2005 | Green .................. H02M 3/1588 315/308 |

(Continued)

FOREIGN PATENT DOCUMENTS

| | | |
|---|---|---|
| CN | 110958004 A | 4/2020 |
| CN | 114019283 A | 2/2022 |
| CN | 114994568 A | 9/2022 |

OTHER PUBLICATIONS

Automotive Three-Phase MOSFET Driver, Apr. 5, 2022, 68 pages.

(Continued)

*Primary Examiner* — Nguyen Tran
(74) *Attorney, Agent, or Firm* — IPHORIZONS PLLC; Narendra Reddy Thappeta

(57) ABSTRACT

A power stage of a voltage regulator includes a high-side switch and a low-side switch connected in series. The high-side switch and the low-side switch are operated to be ON and OFF to generate an output voltage at an output node of the power stage. The output voltage is derived from an input voltage received at an input node of the power stage. The power stage includes a bootstrap capacitor to provide gate drive the high-side switch. The power stage contains a fault-detector for detecting an open condition of the bootstrap capacitor as well as a short condition of the bootstrap capacitor.

20 Claims, 7 Drawing Sheets

(56) References Cited

U.S. PATENT DOCUMENTS

| | | | |
|---|---|---|---|
| 2008/0012546 A1 | 1/2008 | Nagaya et al. | |
| 2008/0218141 A1 | 9/2008 | Lu et al. | |
| 2009/0315595 A1 | 12/2009 | Nakagawa | |
| 2010/0123511 A1 | 5/2010 | Strzalkowski et al. | |
| 2010/0156372 A1* | 6/2010 | Kobayashi | H02M 1/08 323/282 |
| 2010/0259233 A1 | 10/2010 | Cheng | |
| 2011/0018613 A1 | 1/2011 | Wang | |
| 2023/0231376 A1* | 7/2023 | Schwabe | H02M 1/32 361/18 |

OTHER PUBLICATIONS

Yujie Guo, et al., A Bootstrap Structure Directly Charged by BUS Voltage with Threshold-Based Digital Control for High-Speed Buck Converter, Nov. 20, 2021, 14 pages.

Xin Ming, An Advanced Bootstrap Circuit for High Frequency, High Area-Efficiency and Low EMI Buck Converter, IEEE Transactions on Circuits and Systems II: Express Briefs, Apr. 3, 2019, 5 pages, vol. 66, Issue: 5, IEEE.

LMR14020-Q1: If the bootstrap capacitor is not connected b/w SW and boot pin or if the capacitor is shorted then the affect on the regulator will be, downloaded circaDec. 16, 2022, 01 page.

LMR14020-Q1 Simple Switcher® 40 V, 2 A Step-Down Converter with 40 µA IQ, Jul. 2016, 38 pages.

A 3-to-40V 10-to-30MHz Automotive-Use GaN Driver with Active BST Balancing and VSW DualEdge Dead-Time Modulation Achieving 8.3% Efficiency Improvement and 3.4ns Constant Propagation Delay, IEEE International Solid-State Circuits Conference, Feb. 2, 2016, 3 pages.

Sheng Teng Li, et al., A 10MHz GaN Driver with Gate Ringing Suppression and Active Bootstrap Control, 2019 IEEE Workshop on Wide Bandgap Power Devices and Applications in Asia (WiPDA Asia)Date of Conference: May 23-25, 2019, 4 pages.

* cited by examiner

HANDLING CONNECTION FAULTS OF A BOOTSTRAP CAPACITOR IN A SWITCHING CONVERTER

PRIORITY CLAIM

The instant patent application is related to and claims priority from the co-pending India provisional patent application entitled, "Cboot Open/Short Detection", Serial No.: 202241058855, Filed: 14 Oct. 2022, which is incorporated in its entirety herewith to the extent not inconsistent with the description herein.

BACKGROUND

Technical Field

Embodiments of the present disclosure relate generally to switching converters, and more specifically to handling connection faults of a bootstrap capacitor in a switching converter.

Related Art

Switching converters refer to components which convert an input AC (alternating current) or DC (direct current) voltage of one magnitude to an output DC voltage of a desired magnitude by employing and operating switch(es), as is well known in the relevant arts. Switching converters find use as stand-alone power supplies, in voltage regulator modules used in several environments such as laptops, mobile phones, etc.

Switching converters often employ a pair of transistors referred to as a high-side switch and a low-side switch coupled in series, as is also well known in the relevant arts. When the high-side switch is realized as an NMOS transistor (N-channel MOSFET, i.e., N-channel Metal Oxide Semiconductor Field Effect Transistor), a bootstrap capacitor is often employed to assist in generating the voltages needed for switching the high-side switch ON or OFF.

There are often scenarios when a bootstrap capacitor is not operative as desired between pre-specified terminals due to reasons such as human errors, wear and tear (of connections or the capacitor itself), etc. Such scenarios are broadly referred to as connection faults of the bootstrap capacitor. The connection faults can lead to improper operation of the switching converter, damage and/or malfunction of various other components of a switching converter or devices using the switching converter. It is therefore desirable to detect and take any corrective action of such connection faults.

Aspects of the present disclosure are directed to handling of such connection faults of bootstrap capacitors in switching converters.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A power stage of a voltage regulator implemented according to aspects of the present disclosure includes a high-side switch and a low-side switch connected in series. The high-side switch and the low-side switch are operated to be ON and OFF to generate an output voltage at an output node of the power stage. The output voltage is derived from an input voltage received at an input node of the power stage. The power stage includes a bootstrap capacitor to provide gate drive the high-side switch. The power stage contains a fault-detector for detecting an open condition of the bootstrap capacitor as well as a short condition of the bootstrap capacitor.

In an embodiment, the fault-detector includes a comparator circuit a storage block and a logic block. The comparator circuit compares a reference signal with a first current generated based on a difference between respective voltages at a boot node and a switching node across which the bootstrap capacitor is connected. The comparator circuit generates comparison results of the comparison in respective phases in which the high-side switch and the low-side switch are ON. The storage block stores the comparison results. The logic block processes the comparison results to determine whether either of the open condition and the short condition occurs or exists.

Several aspects of the present disclosure are described below with reference to examples for illustration. However, one skilled in the relevant art will recognize that the disclosure can be practiced without one or more of the specific details or with other methods, components, materials and so forth. In other instances, well known structures, materials, or operations are not shown in detail to avoid obscuring the features of the disclosure. Furthermore, the features/aspects described can be practiced in various combinations, though only some of the combinations are described herein for conciseness.

2. Example System

Figure 1:
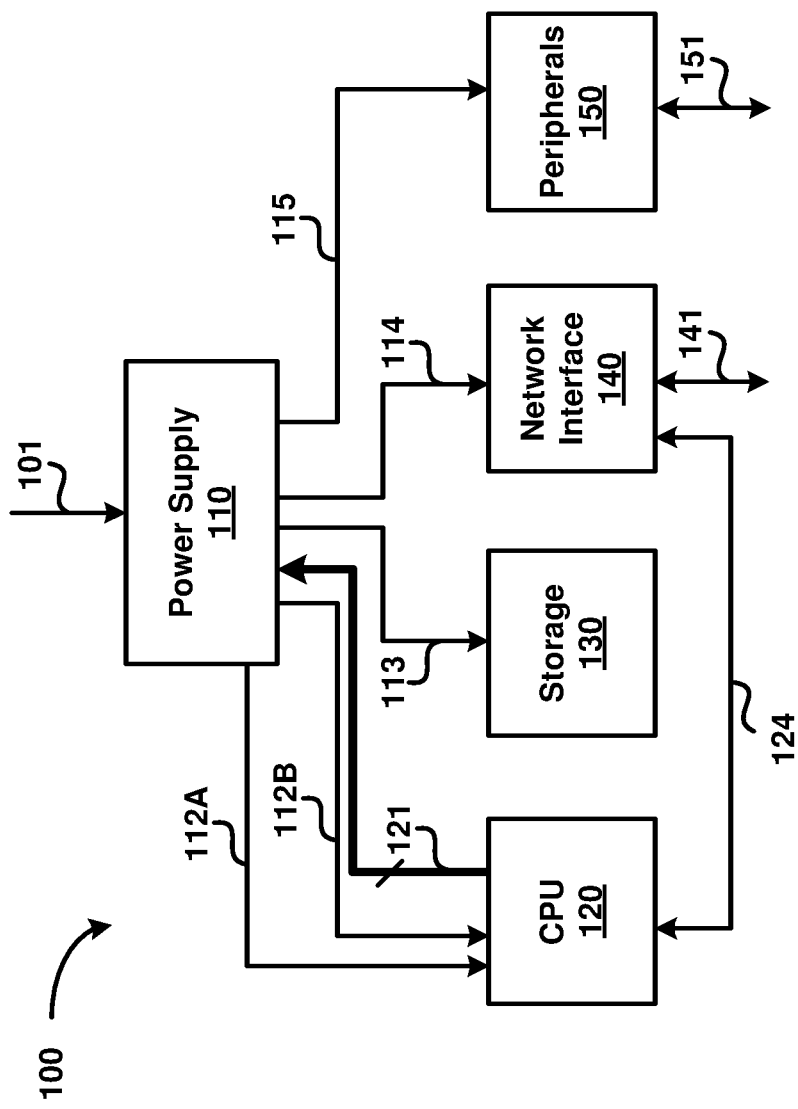
FIG. 1 is a block diagram of an example system in which several aspects of the present disclosure can be implemented.

FIG. 1 is a block diagram of an example system in which several aspects of the present disclosure can be implemented. System 100 is shown containing power supply 110, central processing unit (CPU) 120, storage 130, network interface 140 and peripherals 150. In an embodiment, system 100 corresponds to a computer (desktop, laptop, etc.), although system 100 can represent other types of systems in other embodiments. It is understood that system 100 can contain more or fewer blocks than those shown in FIG. 1.

CPU 120, in general, represents a processor or a system-on-chip (SoC), and is shown as receiving a pair of supply voltages (Va and Vb) on respective paths 112A and 112B from power supply 110. As an example, Va may be a smaller voltage than Vb, and may be used to power a core portion of CPU which may include arithmetic logic unit (ALU), microprogram sequencer, registers, etc. Vb may be used to power the rest of CPU 120, such as for example, input/output (I/O) units, I/O buffers, on-chip peripherals etc. CPU 120 provides various signals (all deemed to be contained in path 121) specifying, among others, its power supply requirements to power supply 110. Examples of such signals can be those that specify the specific mode of operation (in terms of power consumption) such as PS1, PS2, PS3, etc., which refer to "Power Save States for Improved Efficiency".

Storage 130 represents a memory that may include both volatile and non-volatile memories. For example, in a personal computer, storage can include magnetic memory (hard disk) as well as solid state memory (RAM, Flash, etc.). Storage 130 is shown receiving a supply voltage on path 113 for powering various circuits and blocks within.

Network interface 140 operates to provide two-way communication between system 100 and a computer network, or in general Internet. Network controller 140 implements the electronic circuitry required to communicate using a specific physical layer and data link layer standard such as Ethernet or Wi-Fi™. Network interface 140 may also contain a network protocol stack to allow communication with other computers on a same local area network (LAN) and large-scale network communications through routable protocols, such as Internet Protocol (IP). Network interface 140 receives a power supply on path 114 for powering internal circuits and blocks. Network interface 140 communicates with external systems and CPU 120 on path 141 and path 124 respectively.

Peripherals 150 represents one or more peripheral circuits, such as for example, speakers, microphones, user interface devices, etc. Peripherals 150 receives a power supply on path 115, and communicates with external devices on path 151.

Power supply 110 receives one or more sources of power (e.g., battery) on path 101, and operates to provide the desired power supply voltages on paths 112A, 112B, 113, 114 and 115. In an embodiment, power supply 110 is designed to contain one or more DC-DC converters within to generate the power supply voltages. Power supply 110 responds to signals from CPU 120 received on path 121 to reduce/increase current output based on the specific signal (e.g., PS1, PS2 and PS3).

In an embodiment, power supply 110 is a voltage regulator module (VRM), sometimes also called processor power module (PPM), and contains one or more voltage regulators. The voltage regulators include step-down switching (buck) converters to generate several smaller voltages from a higher-voltage supply source. In other embodiments however, other types of DC-DC converters such as boost, buck-boost, hysteretic converters etc., can be implemented instead of a buck converter. With a VRM, multiple devices/ICs requiring different supply voltages can be mounted on the same platform, for example, a computer motherboard of a personal computer (PC). Accordingly, the description is continued with respect to a VRM as shown in FIG. 2.

3. Voltage Regulator Module

Figure 2:
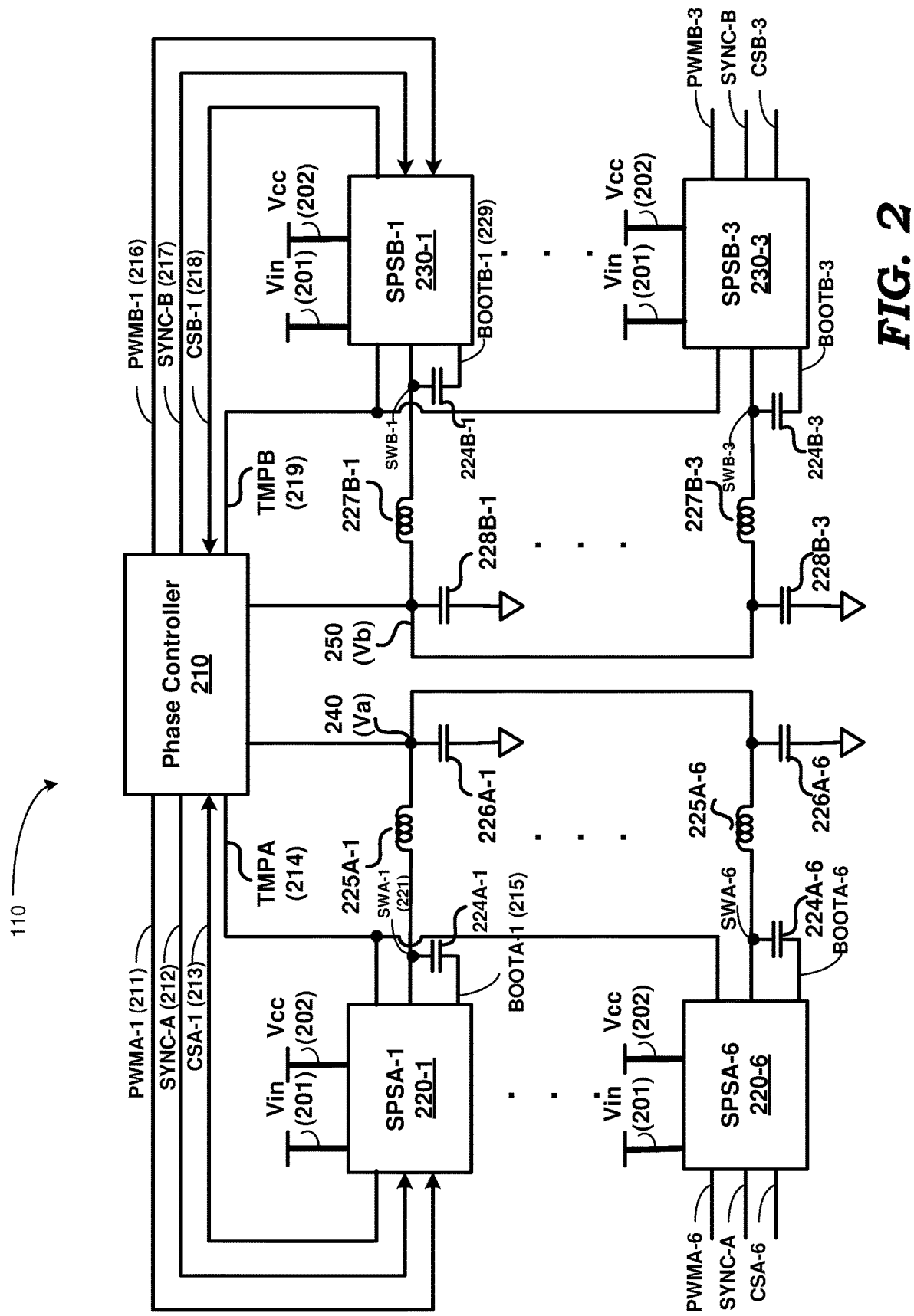
FIG. 2 is a block diagram illustrating the details of a voltage regulator module (VRM) in an embodiment of the present disclosure.

FIG. 2 is a block diagram illustrating the details of a VRM in an embodiment of the present disclosure. Power supply 110 is implemented as a Voltage Regulator Module and is shown containing phase controller 210, smart power stages (SPS) SPSA-1 (220-1) through SPSA-6 (220-6), SPSB-1 (230-1) through SPSB-3 (230-3), inductors 225A-1 through 225A-6, 227B-1 through 227B-3, output capacitors 226A-1 through 226A-6, 228B-1 through 228B-3, and bootstrap capacitors 224A-1 through 224A-6, 224B-1 through 224B-3. Each bootstrap capacitor associated with an SPS is shown connected between respective nodes SW and BOOT of the corresponding SPS. Thus, bootstrap capacitor 224A-1 is shown connected between switching node SWA-1 (221) and BOOTA-1 (215). Although bootstrap capacitor is shown connected external to each SPS, in alternative embodiments, bootstrap capacitor may be internal to the SPS. It is noted here that, in general, the term 'voltage regulator' refers to either a stand-alone regulator (such as a stand-alone switching converter) or a portion (such as a smart power stage) of a stand-alone regulator.

Power supply Va (240) is generated by a 6-phase buck converter (there are six SPSes—220-1 through 220-6), while power supply Vb (250) is generated by a 3-phase buck converter (there are three SPSes—230-1 through 230-3). Nodes/Paths 240 and 250 correspond to paths 112A and 112B respectively of FIG. 1. In the interest of conciseness, other power supply circuits that generate supplies on paths 113, 114 and 115 are not shown in FIG. 2.

Phase controller 210 performs regulating functions to enable the generation of regulated voltages Va and Vb. Accordingly, Va and Vb are shown as being provided as inputs to phase controller 210, to enable operation of one or more feedback loops within phase controller 210 to regulate Va and Vb. Phase controller 210 also receives inductor-current information (current flowing through each of the inductors) from each of the SPSes to enable various operations such as current-mode control of voltage regulation, current limiting, short circuit protection, and balancing the currents generated by each SPS of a same converter so as to make the currents from each SPS of a converter to be substantially equal in magnitude.

The combination of (corresponding circuitry within) phase controller 210, an SPS, an inductor and a capacitor forms one "phase" of each multi-phase buck converter. Thus, for example, SPSA-1, inductor 225A-1, capacitor 226A-1, and the corresponding portion within phase controller 210 form a single buck converter, and one phase of the 6-phase buck converter. It is noted here that, while each phase is shown as having its own separate capacitor (e.g., 226A-1), in another embodiment, only a single larger capacitor (larger capacitance) may be employed at node 240 (as well as 250). In other embodiments, multiple capacitors are placed close to the load powered by the corresponding supply voltage.

Each SPS may be implemented to contain a high-side switch, a low-side switch, gate-drive circuitry for the two switches, and other circuits. Examples of other circuits include but are not limited to temperature monitor circuit, inductor-current sense (or emulation) circuit, etc. to provide information, such as temperature of the SPS, magnitude of inductor current, etc. to phase controller 210. Each SPS receives a source of power as an input which is connected to the high-side switch (shown in detail in sections below). In FIG. 2, the supply source is numbered 201, and has a voltage Vin. Typical value of Vin in a VRM is about 21 volts (V). Each SPS is also shown as receiving bias voltage Vcc on path 202. Typical value of Vcc in a VRM is about 3.3 V.

Each SPS communicates with phase controller 210 via corresponding signals PWM, SYNC, CS and TMP. Thus, SPSA-1 is shown connected to phase controller 210 through signal/paths PWMA-1 (211), SYNC-A (212), CSA-1 (213) and TMPA (214). SPSA-6 communicates with phase controller 210 via signals PWMA-6, SYNC-A, CSA-6 and TMP (214). Similarly, SPSB-1 is shown connected to phase controller 210 through signal/paths PWMB-1 (216), SYNC-B (217), CSB-1 (218) and TMPB (219). SPSB-3 communicates with phase controller 210 via signals PWMB-3, SYNC-B, CSB-3 and TMP (219). The other SPSes would have similar connections with phase controller 210.

Signal PWM is an input to an SPS and is a pulse-width modulated (PWM) signal, which may, for example, be a signal of a fixed frequency but variable duty-cycle, and whose frequency is potentially modifiable by phase controller 210 based on load-current demands. The PWM signal controls the opening and closing of high-side switch and low-side switch of the SPS. The duty cycle of the PWM signal is set by phase controller 210 and is designed to generate the desired power supply voltage and/or control/change the current supplied by that phase. For example, PWMA-1 would have a duty cycle as required for the magnitude of Va and the current to be provided by SPSA-1. As is well known in the relevant arts, the PWM signals to each SPS of a same converter are typically staggered, i.e., delayed with respect to each other in phase such that typically the ON duration of no two (or more) high-side switches or low-side switches in the converter (i.e., respective SPSes) overlaps. Such a technique is employed for reasons such as, for example, to ensure that the peak instantaneous current drawing from Vin is relatively low (or zero) at all times.

In an embodiment, signal PWM represents tri-state input from phase controller 210. When logic LOW is detected by the SPS on signal PWM, the low-side switch is turned ON, and when logic HIGH is detected on signal PWM, the high-side switch is turned ON. A high-impedance (hi-Z) value on signal PWM is designed to turn OFF both the high-side and the low-side switches of the corresponding SPS.

Signal TMP is an output from an SPS to phase controller 210, and provides information regarding the temperature in the SPS. Phase controller 210 may process the TMP signal (or the information contained in it) to adjust the current supplied by that phase, or for shut-down of the VRM. The TMP outputs of each phase of a converter are wired together, and a single input is connected to phase controller 210.

Signal SYNC is an input to an SPS and may be used by phase controller 210 for the purposes of waking-up the SPS upon power-up of the power supply 110, and also to indicate the power-mode/save (e.g., PS2, PS3), i.e., output current requirement, of the multi-phase converter. Typically, all SPSes of the same converter share a single SYNC signal. Signal SYNC is received before signal PWM starts to transition between logic HIGH and logic LOW states.

Signal CS (current sense) is an input to phase controller 210 from an SPS, and contains information regarding the magnitude of the inductor current of that phase. The information can be in the form of a current, voltage, digital values, etc.

Each SPS is shown associated with a corresponding bootstrap capacitor to drive the high-side switch in the SPS. Accordingly, the implementation details of an SPS in an embodiment of the present disclosure are described next.

4. Smart Power Stage (SPS)

Figure 3:
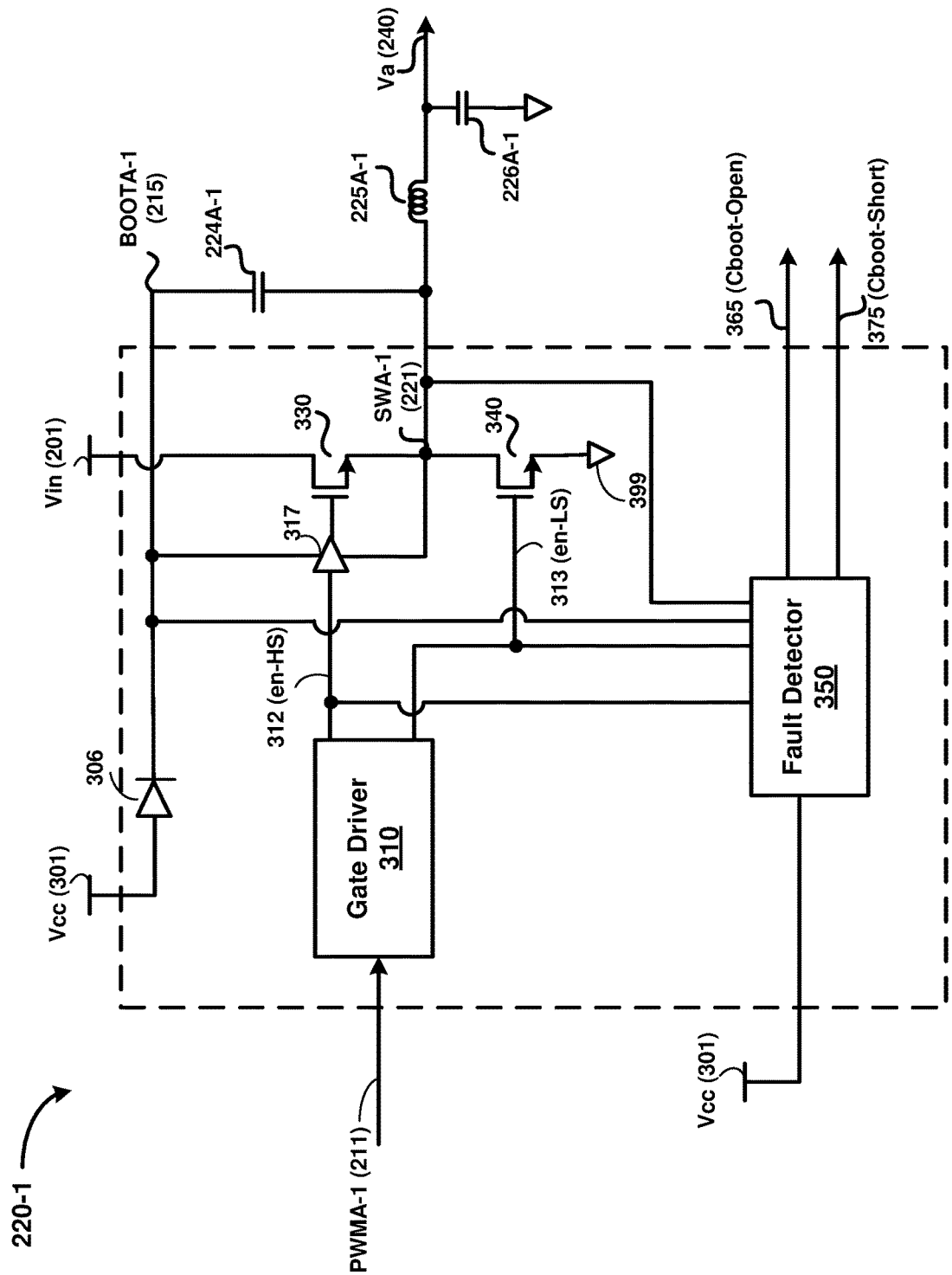
FIG. 3 is a block diagram illustrating the implementation of an SPS in an embodiment of the present disclosure.

FIG. 3 is a block diagram illustrating the implementation of an SPS in an embodiment of the present disclosure. SPSA-1 (220-1) is shown in detail in FIG. 3. The other SPSes can also be implemented to be similar to SPSA-1. However, in other embodiments, an SPS can have more or fewer blocks. SPSA-1 is shown containing gate driver 310, high-side (HS) switch 330, low-side (LS) switch 340, level-shifter 317, and fault-detector block 350. Also shown in FIG. 3 are inductor 225A-1, output capacitor 226A-1, bootstrap capacitor 224A-1, and diode 306. Node 240 provides the supply voltage Va.

Gate driver 310 receives signal PWMA-1 (211), and in response to the logic level of PWMA-1 generates the appropriate voltage to turn ON and turn OFF HS switch 330 and LS switch 340 in corresponding intervals indicated by PWMA-1. Turning ON a switch implies that the switch is closed and therefore provides an electrical path across the switch terminals for conduction of current. HS switch 330 and LS switch 340 are each shown implemented as an N-channel MOSFET (Metal Oxide Semiconductor Field Effect Transistor) with gate driver 310 driving the gate terminals of the MOSFETs, although other implementations for the switches having similar characteristics can benefit from the features described herein. Further, it is noted here that rather than a single block, two separate gate drivers may instead be employed—one for driving the gate of the HS switch to be ON or OFF, and another for driving the gate of the HS switch to be ON or OFF.

In the example of FIG. 3, when PWMA-1 is a logic HIGH (corresponding to a first logic state), gate driver 310 generates respective appropriate voltages on paths 312 (en-HS) and 313 (en-LS) to switch ON MOSFET 330 and switch OFF MOSFET 340. When PWMA-1 is a logic LOW (corresponding to a second logic state), gate driver 310 generates respective appropriate voltages on paths 312 and 313 with logic levels needed to switch OFF MOSFET 330 and switch ON MOSFET 340. Gate driver 310 needs to provide only low-voltage swing (e.g., 0V-3.3V) in generating logic HIGH and logic LOW for signal en-LS (313). However, as is described further below, gate driver 310 may require to generate a voltage higher than Vin (201) (which, for example, is 21V in an embodiment, although it can be higher in other embodiments) to maintain HS switch 330 in the ON state during HS phases. In the embodiment of FIG. 3, gate driver 310 generates en-HS with low voltage-swing (0V-3.3V) logic levels. As described further below, level-shifter 317 operates in conjunction with bootstrap capacitor 224A-1 to enable level-shifting of en-HS 312 to higher voltages to maintain HS switch in the ON state after HS switch is turned ON. Although shown separate from gate driver 310 in the interest of clarity, in an alternative embodiment, level-shifter 317 is implemented as part of gate driver 310, although the same or similar inter-connections, and bootstrap capacitor would also be used even in such alternative embodiment.

In embodiments described herein, each of HS switch 330 and LS switch 340 is implemented using a respective N-channel MOSFET. In particular, HS switch 330 is implemented as an N-channel MOSFET rather than a P-channel MOSFET for advantages such as greater (channel) current capability with lower implementation area (or die area) for the HS switch. As is well-known in the relevant arts, an N-channel MOSFET is a type of MOSFET in which the current in the channel is predominantly due to electrons (rather than holes). However, the gate terminal of an N-channel MOSFET needs to be driven to a voltage whose magnitude is higher than the voltage at the source terminal by at least a threshold value (Vth1) in order to turn the switch ON, as is well known in the relevant arts. This requirement does not present a problem for LS switch as the source terminal of LS switch is coupled to ground (see FIG. 3), and voltage level corresponding to a logic HIGH on path 312 (en-LS) is sufficient to (substantially) exceed the threshold voltage of LS switch, thereby turning ON the LS switch.

In the case of HS switch 330, the gate terminal of the HS switch needs to be driven to a voltage whose magnitude is higher than Vin (201) in order to drive (or at least maintain) HS switch ON with a very low ON-resistance. This is needed since as HS switch starts turning ON, LS switch 340 has already been switched OFF, the voltage at node SWA-1 starts increasing towards Vin, and eventually equals Vin (which may be, for example, 21 volts or so). Therefore, the gate voltage of HS switch 330 may need to be at a minimum of Vin+Vth1 (threshold voltage of HS switch). To turn HS switch fully ON (so that it has a very low ON-resistance), the gate voltage may need to be sufficiently higher than (Vin+Vth1). Typically, a voltage with magnitude of at least (Vin+Vth1+Vgs-ON) is required, wherein Vgs-ON is the additional voltage across gate and source to achieve a very low ON resistance of the HS switch. Therefore, a bootstrap capacitor such as 224A-1 is employed to assist in generating the high supply voltage (Vin+Vth1+Vgs-ON) or greater.

Bootstrap capacitor 224A-1 charges during the time period when en-LS (312) is a logic HIGH, and may lose some of the accumulated charge during the time period when en-HS (313) is a logic HIGH. The voltage at boot node (215) is close to bias voltage Vcc (202) (which may for example be 3.3V) when en-LS is a logic HIGH, and rises to approximately (Vin+Vcc) when en-HS is a logic HIGH.

Accounting for voltage drop (Vdelta) across diode 306, the voltage across bootstrap capacitor 224A-1, and therefore across nodes BOOTA-1 and SWA-1 is always substantially equal to Vcc-Vdelta always/continuously in all HS and LS phases ignoring capacitor discharge, and other charge losses. Thus, under 'no fault' condition, voltage between nodes 215 (BOOTA-1) and (SWA-1) 221 satisfies the following equation:

(BOOTA-1–SWA-1)=(*Vcc*–*V*delta)   Equation (1).

However, when a bootstrap capacitor connection fault occurs or exists, equation (1) may not hold true, as will be described below in further detail.

Fault-detector 350 receives signals en-HS (312), en-LS (313), voltages Vcc (301), BOOTA-1 (215), SWA-1 (221), and generates signals Cboot-Open (365) and Cboot-Short (375). Fault-detector 350 operates to detect connection faults of bootstrap capacitor 224A-1 based on voltages 215 (BOOTA-1) and 221 (SWA-1), as will be described in detail below. Fault-detector 350 generates a logic HIGH on path 365 (Cboot-Open) and a logic LOW on path 375 (Cboot-Short) when open fault is detected. Fault-detector 350 generates a logic HIGH on path 375 (Cboot-Short) and a logic LOW on path 365 (Cboot-Open) when short fault is detected. A controller block (not shown in FIG. 3) may receive the signals Cboot-Open (365) and C-boot-Short (375) generated by fault-detector 350, and indicate a fault for example by activating an audio or visual signal to indicate a fault to a user. The user may then take corrective action to correct the fault. Alternatively, in response to the signals Cboot-Open (365) and C-boot-Short (375) generated by fault-detector 350, SPSA-1 (220-1) may stop responding to signal PWMA-1 received from phase controller 210, thereby maintaining both the high-side and low-side switches in the OFF condition.

As depicted in FIG. 2, bootstrap capacitor (e.g., 224-1) may be connected external to an SPS (e.g., SPSA-1, 220-1, between nodes 215 and 221). Accordingly, due to reasons such as human error, poor/improper soldering, bootstrap capacitor damage, etc., there is a likelihood/probability that the nodes 215 and 221 are either left unconnected (e.g., bootstrap capacitor is not connected, or if connected, is faulty/open) or shorted (e.g., the bootstrap capacitor is itself a short even if connected, or the bootstrap capacitor is not present or properly connected but the two nodes are connected electrically with little or zero resistance due to some other defect). Even if the bootstrap capacitor were to be connected between nodes 215 and 221, or connected internal to the SPS in alternative embodiments, operating conditions (such as voltage, etc.), environmental conditions (such as temperature, etc.), and other mechanical conditions (such as wear and tear of connections or the bootstrap capacitor itself) may lead to faults in connection of the bootstrap capacitor in operation. Such faults, if left undetected/untreated, may result in damage to the corresponding SPS and VRM 110.

It is therefore desirable to continuously monitor the current through/voltage across boot node and switching node (i.e., across the nodes between which bootstrap capacitor is normally connected) to identify connection faults of the bootstrap capacitor. The description is continued with example implementations of a fault-detector implemented inside SPS (such as SPS 220-1) to identify such faults in an embodiment.

5. Fault-Detector Block

Figure 4:
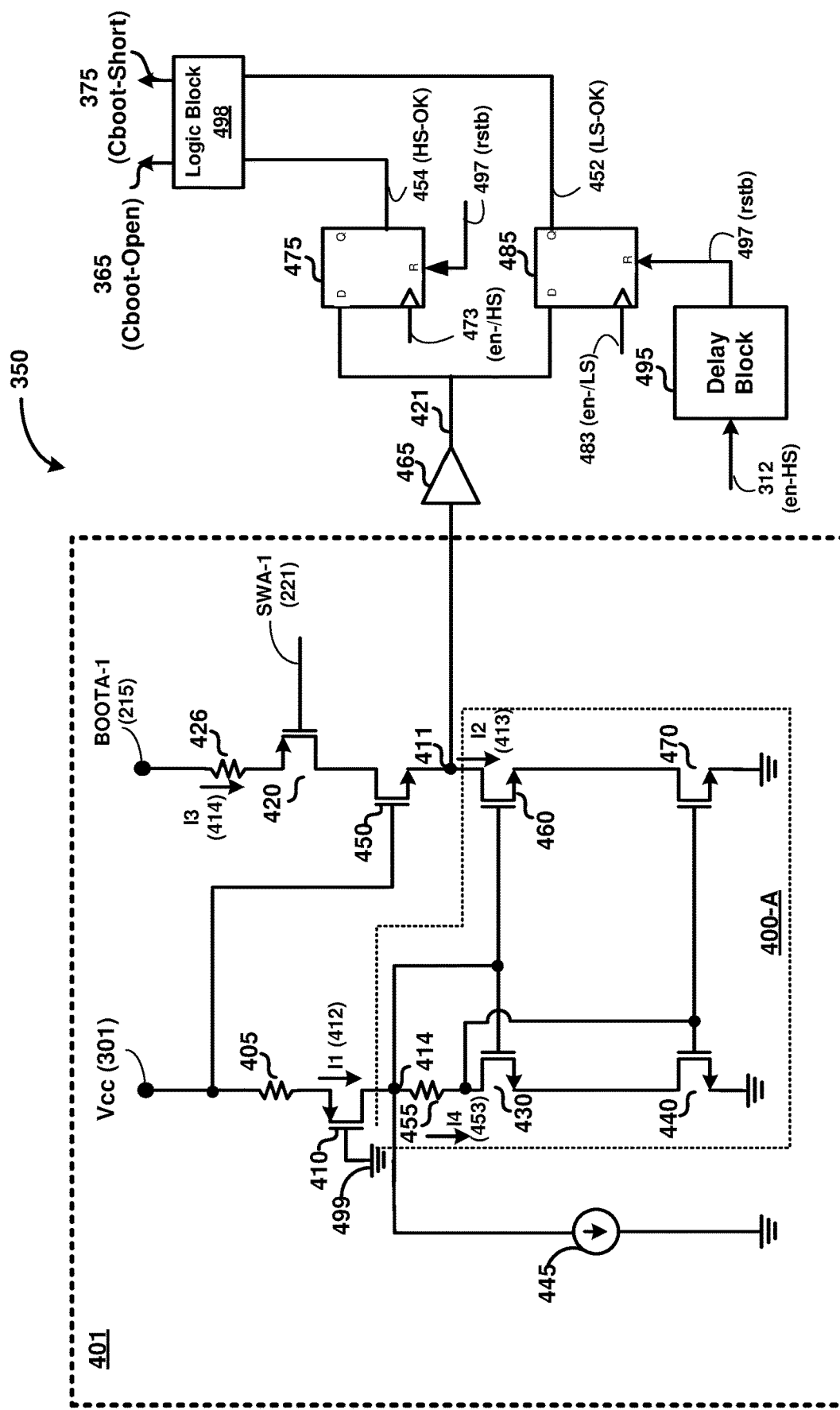
FIG. 4 is a diagram illustrating the details of a bootstrap-capacitor fault-detector block in an embodiment of the present disclosure.

FIG. 4 is a diagram illustrating the details of a fault-detector block in an embodiment of the present disclosure. Fault-detector 350 is shown containing circuit 400-A, resistors 405, 426, transistors 410, 420, 450, current sink 445, delay block 495, current-to-voltage (I2V) converter 465 and flip-flops 475 and 485. It is noted herein that the details of fault-detector block 350 as relevant to the disclosure have been provided and described. However, it is to be understood that in alternative implementations of fault-detector block 350, circuit 400-A may be implemented differently, and use more or fewer components and circuitry. For example, although the description is continued with respect to a current comparator, alternative implementations may compare voltage across nodes 215 and 221 to detect connection faults, as will be apparent to a skilled practitioner by reading the disclosure herein.

Circuit 400-A is shown containing resistor 455 and transistors 430, 440, 460 and 470. Circuit 400-A represents a cascode current mirror circuit that operates to receive current I1 (412) and generate current I2 (413) at node 411. The transistors of the mirror are matched and have the same dimensions, and thus (in the absence of current sink 445, as described below) I2 (413) equals current I1 (412). Resistor 455 generates a bias voltage for circuit 400-A, although other biasing techniques may be employed in alternative embodiments, as will be apparent to a skilled practitioner by reading the disclosure herein. Although the illustrative embodiment depicts a cascode mirror circuit (used for better output impedance), circuit 400-A may be implemented with two transistors only (e.g., 440 and 470) with corresponding changes in the circuit, as will be apparent to a skilled practitioner upon reading the disclosure herein.

In an embodiment, transistors 410, 420 and 450 are high-voltage (e.g., 30V) tolerant transistors, while all other transistors as well as other active components are designed with only low-voltage (e.g., 0V-3.3V or 0V-5V) tolerant components. As is well known in the relevant arts, a high-voltage transistor refers to a transistor that has high breakdown voltage characteristics, typically the maximum drain-source voltage Vds beyond which the transistor would breakdown. The 30V tolerance noted above is an example only, and the specific voltage depends on the magnitude of Vin. Transistors 420 and 450 need to support higher breakdown voltages since voltage at node BOOTA-1 can exceed Vin, which in the examples herein is around 21 volts. Such protection is required as the voltage at boot node BOOTA-1 (215) may go as high as around 23V as noted above. Transistor 410 needs to be matched to transistor 420 (as noted below) and is therefore high-voltage tolerant. Transistor 450 is always ON since its gate terminal is connected to Vcc.

Transistors 410 and 420 are shown to be implemented as p-type MOSFETs. The source terminal of transistor 410 is shown connected to voltage Vcc (301) via resistor 405 (having a resistance value of R1 Ohms) and the gate terminal is shown connected to ground (499). The source terminal of transistor 420 is shown connected to boot node (215) via resistor 426 (having a resistance value of R2 Ohms) and the gate terminal is shown connected to switching node (221). In operation, current I1 (412) through resistor 405 is given by the following equation:

$$I1=(Vcc-Vtp1)/R1 \quad \text{Equation (2);}$$

wherein, Vtp1 represents the threshold voltage of transistor 410.

Current I3 (414) through resistor 426 is given by the following equation:

$$I3=\{BOOTA\text{-}1-(SWA\text{-}1+Vtp2)\}/R2 \quad \text{Equation (3)}$$

wherein Vtp2 represents the threshold voltage of transistor 420.

Transistors 410 and 420 are matched such that Vtp1 equals Vtp2, and the magnitudes of resistances R1 and R2 are implemented to be equal.

As noted above, in the absence of any connection faults of bootstrap capacitor 224A-1, the voltage across bootstrap capacitor 224A-1 (or equivalently, between nodes BOOTA-1 and SWA-1) would be equal to [Vcc-Vdelta], i.e., voltage [(BOOTA-1-SWA-1) substantially equals voltage (Vcc-Vdelta). If, however, [(BOOTA-1-SWA-1) is not equal to (Vcc-Vdelta), then a fault condition exists. As is shown below, when either an open or a short across nodes BOOTA-1 and SWA-1 exists, the magnitude of (BOOTA-1-SWA-1) will be substantially (rather than by a very small value) different from (Vcc-Vdelta) in one or both of the HS phases and LS phases, as described below.

The combination of circuit 400-A, resistors 405, 426, transistors 410, 420, 450, and current sink 445 may be viewed as a current-mode comparator block (401). The combination of block 401 and I2V converter 465 may be viewed as a "comparator circuit". As will be clear from the description below, the circuit formed by resistor 426, transistors 420, 450, 460 and 470, in combination with the corresponding connections as shown in FIG. 4, may be viewed as a 'current comparator' of current comparator block 401. The circuit 'arm' formed by resistor 405, transistor 410, resistor 455, transistors 430 and 440, and current sink 445, and the corresponding connections as shown in FIG. 4, may be viewed as a 'reference circuit' that sets the magnitude of 'reference current' I2 (413) (which is a constant once set). In operation, the 'current comparator' compares the magnitude of I3 with that of I2. If I3 is greater than I2, output voltage (421) of I2V is at one of two binary logic levels (logic HIGH in the example of FIG. 4). Output voltage (421) of I2V is at the other binary logic level (logic LOW in the example of FIG. 4) otherwise.

Current sink 445 is implemented to draw/sink a current from node 414. The magnitude of current sinked by current sink 445 from node 414 may be configurable by the user (via corresponding means not shown, but which would be apparent to a skilled practitioner). In an embodiment, the magnitude of current pulled from node 414 by current sink 445 is configured such that the sink-current (I445) corresponds to a voltage that is Vcc/k, (k being real number). That is, sink-current (I455) causes the same effect to the operation of the current comparator as if Vcc were reduced to Vcc/k. and sets the trip-point (switching threshold) of the current comparator. The number represented by 'k' may be chosen such that Vcc/k is close to Vcc/2. In an embodiment, current I445 corresponds to 1.5V. Therefore, the magnitude of I2 (and I4 453) becomes (I1-I445). The 'current comparator' in effect compares I3 with I2. Thus:

$$I2=I4=(I1-I445) \quad \text{Equation (4)}$$

I1-I445 has a fixed value (non-changing) that, in the embodiment, approximately equals I1/2.

Therefore, I2 becomes approximately I3/2.

Although the illustrative embodiment is shown as employing current sink 445 to set the trip point of the current comparator, in alternative embodiments, other suitable approaches may be employed without current sink 445, but with corresponding changes to the circuit to set the trip point such that the output conditions for 'open' and 'short' faults still hold true. For example, the magnitudes of resistors R1 and R2 may be implemented to be unequal (e.g., with R1 being much greater than R2). Various other approaches would be apparent to one skilled in the relevant arts upon reading the disclosure herein.

The comparator circuit (combination of block 401 and I2V converter 465) is a continuous-time comparator, and is continuously operative to generate corresponding logic levels or voltage levels for all time instances.

Flip-flop 475 is clocked by signal en-/HS (473). Signal en-/HS (473) is the logical inverse of signal en-HS (312). Flip-flop 475 receives logic level of signal 421 at its D input and generates on output (Q) signal HS-OK (454). In an embodiment, flip-flops 475 and 485 are implemented as positive edge triggered flip-flops. Accordingly, flip-flop 475 operates to store signal 421 synchronous with a rising edge of signal en-/HS (473). Similarly, flip-flop 485 is clocked by signal en-/LS (483), which is the logical inverse of en-LS (313), and operates to store signal 421 synchronous with a rising edge of signal en-/LS (483). Thus, flip-flop 475 stores the logic value of signal 421 at end of every HS-phase (i.e., at, or slightly prior to, the time instant when HS switch turns OFF). Similarly, flip-flop 485 stores the logic value of signal 421 at end of every LS-phase (i.e., at, or slightly prior to, the time instant when LS switch turns OFF). Flip-flops 475 and 485 are reset asynchronously by signal rstb received on path 497. In an embodiment, flip-flops 475 and 485 are designed to be reset upon receiving a logic LOW signal at their R (reset) input.

Signals HS-OK (454) and LS-OK (452) are used to indicate whether or not a fault exists in the corresponding phase. Specifically, a logic HIGH on path 454 (HS-OK) indicates that there is no fault during the corresponding HS-phase, while a logic HIGH on path 452 (LS-OK) indicates that there is no fault during the corresponding LS-phase, while a logic LOW on the respective paths indicates a fault in the corresponding phase.

Fault-detector 350 is implemented to contain a logic block (498) that receives HS-OK (454) and LS-OK (452), processes signals 454 and 452 at every cycle of PWMA-1 to generate signals Cboot-Open (365) and Cboot-Short (375), based on logic described below.

Delay block 495 receives signal en-HS on path 312 and generates a blanking signal (rstb) on path 497. Upon reset or power-ON of power supply 110, delay block 495 maintains (via path 497) in reset for a pre-determined number (specified by user via corresponding means not shown, or hard-wired in delay block 495) of cycles of PWMA-1 before releasing the reset signal rstb on path 497. Therefore, the Q output of each of flip-flops 475 and 485 is set to logic LOW for the pre-determined number of PWMA-1 cycles. Thus, logic signal 420 is blanked for the pre-determined cycles. Such blanking may be necessary to prevent unwanted triggering of fault conditions by fault-detector 350 when the SPS is just starting up (after power ON/reset), and the voltages (e.g., Vcc) have not yet reached their steady-state value. In an embodiment, the pre-determined number of PWMA-1 cycles is 15.

The description is continued to illustrate the manner in which fault-detector 350 operates to identify open and short faults of bootstrap capacitor 224A-1 in an embodiment of the present disclosure.

6. Identifying Open and Short Faults of Bootstrap Capacitor

Figure 5A:
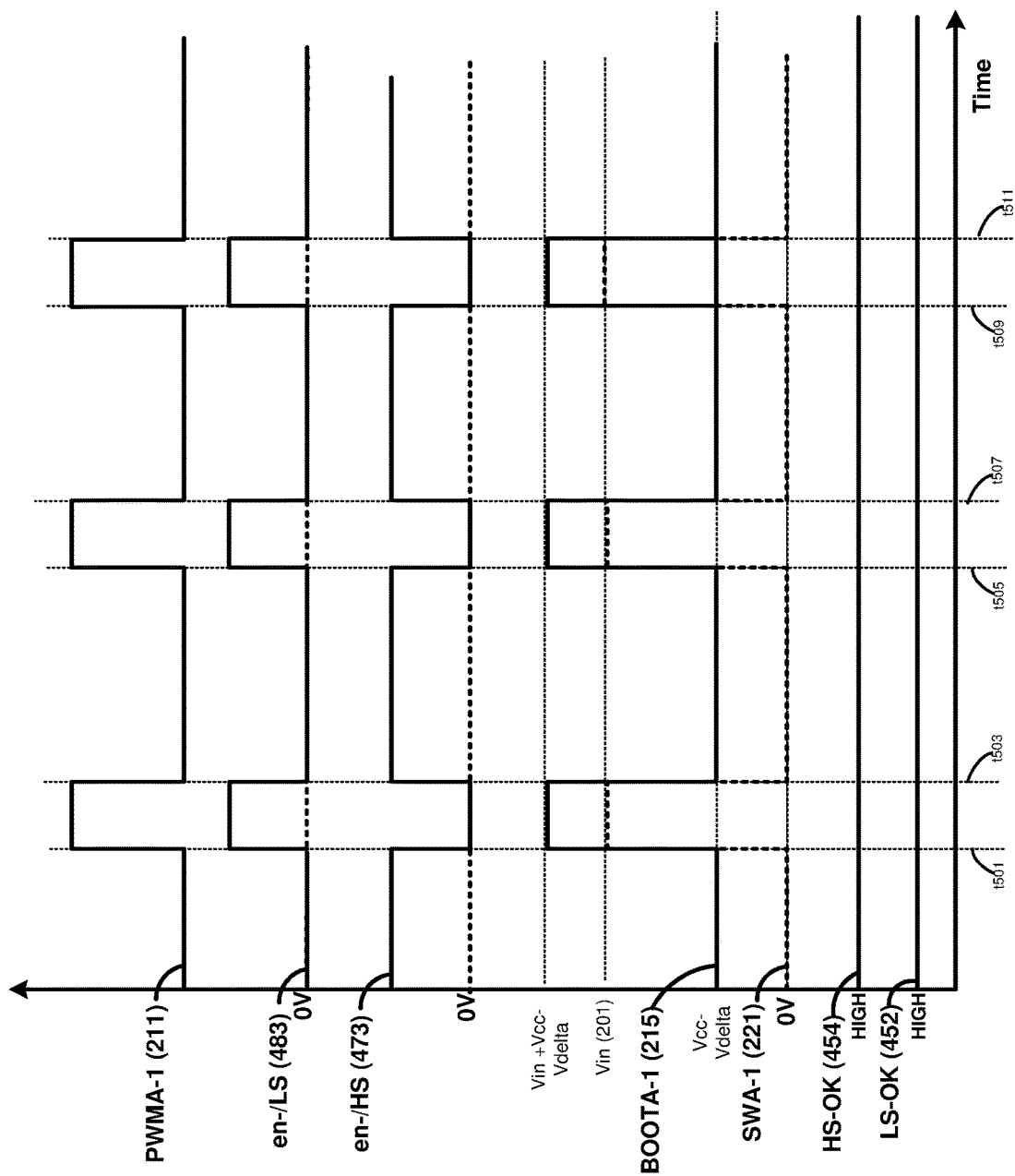
FIGS. 5A-5C are timing diagrams illustrating example waveforms of voltages at various nodes under various conditions of an SPS, in an embodiment of the present disclosure.
Figure 5B:
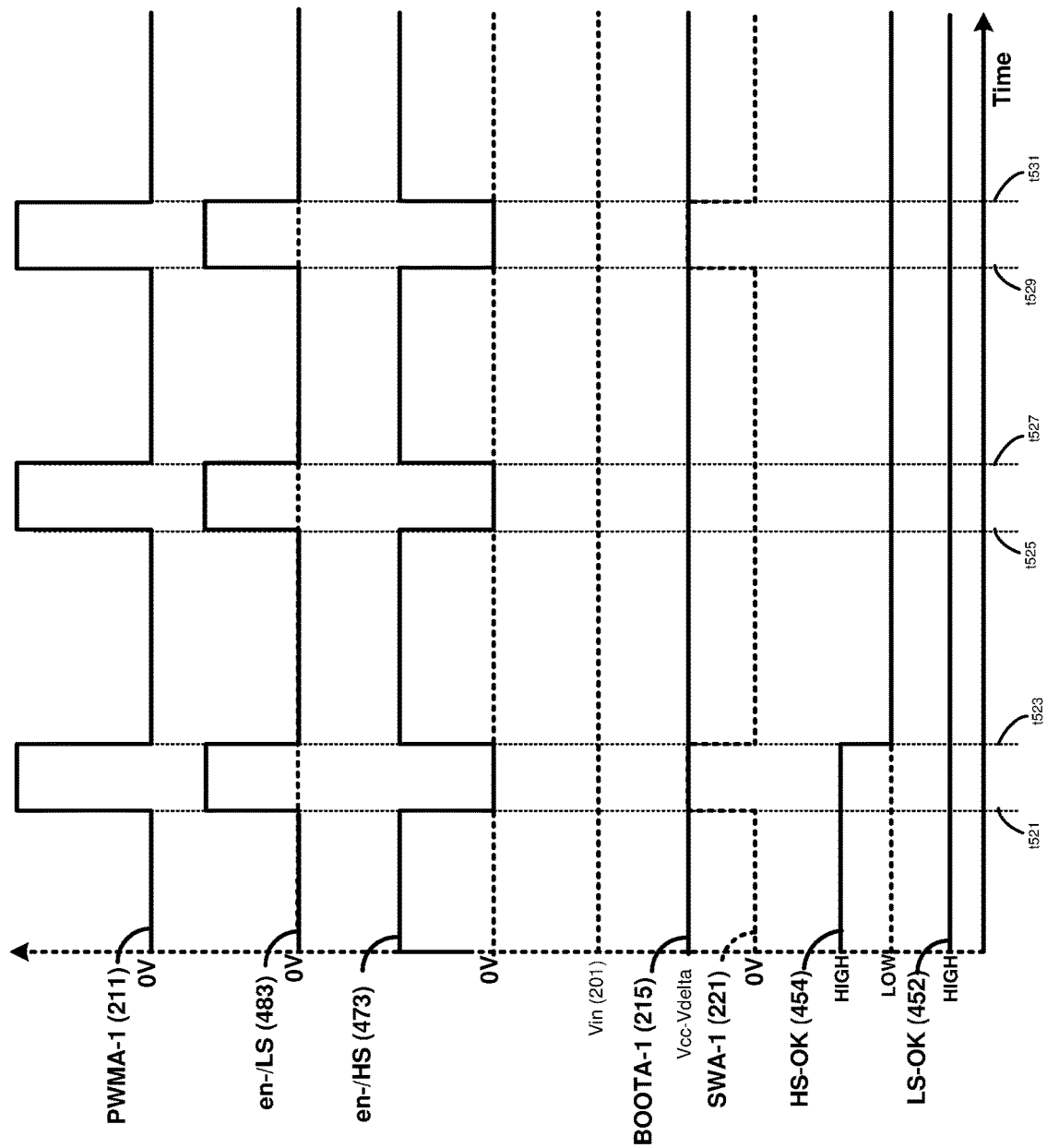
Figure 5C:
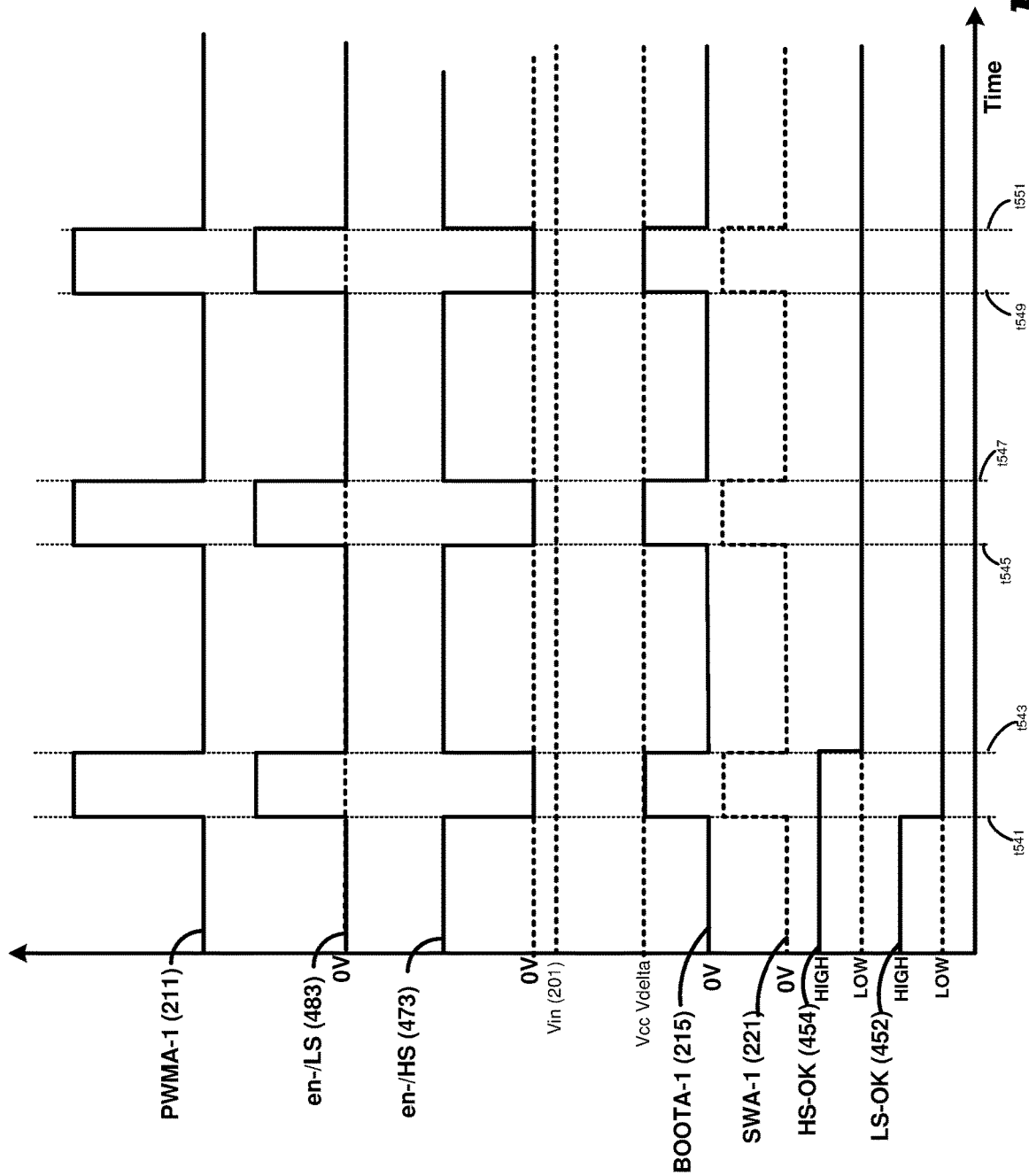

FIGS. 5A-5C together with FIGS. 3 and 4 illustrate the operation of fault-detector 350. FIGS. 5A-5C are timing diagrams (not to scale) depicting example waveforms of voltages at various nodes under various conditions.

No Fault:

FIG. 5A is a timing diagram (not to scale) illustrating the operation of fault-detector 350 in the situation when there are no connection faults of bootstrap capacitor 224A-1. FIG. 5A shows example waveforms of PWMA-1 (211), en-/LS (483), en-/HS (473), BOOTA-1 (215), SWA-1 (221), signals HS-OK (454) and LS-OK (452). It is assumed that the pre-determined number of cycles of blanking noted above have elapsed prior to time instant t501, and signal rstb (497) has been de-asserted by delay block 495.

Time durations t501-t503, t505-t507 and t509-t511 depict HS-phase instances, i.e., durations in which HS switch 330 is ON (and LS switch 340 is OFF). Time durations t503-t505 and t507-t509 depict LS-phase instances, i.e., durations in which durations when HS switch 330 is OFF (and LS switch 340 is ON). Thus, three cycles of PWMA-1 are shown in FIG. 5A.

In the HS-phase (HS is ON) in t501-t503, SWA-1 is at Vin volts and BOOTA-1 is at (Vin+Vcc−Vdelta), as may be verified from FIG. 3, since there are no bootstrap capacitor faults. Therefore, RBOOTA-1−SWA-1) equals (Vcc−Vdelta), which is the expected result when no bootstrap capacitor faults exist. As a result, I3 of the current comparator of fault detector 350 of FIG. 4 has a magnitude as noted above in Equation 3. I1 has a magnitude as noted above in Equation 2. I2 and I4 are each equal to I2 (I1−I445), as noted above in Equation 4. Now, I1 equals I3, since R1 (405) equals R2 (426) and Vtp1 equals Vtp2, as noted above. Therefore, I2 (i.e., (I1−I445)) is less than I3. As a result, I2V converter 465 generates a logic HIGH. Accordingly, HS-OK 454 is shown in interval t501-t503 as a logic HIGH and indicates signals "no fault" in the corresponding HS-phase. In the LS-phase of the first cycle in interval t503-t505 also, I3 is greater than I2 (since BOOTA-1−SWA-1 continues to be equal to (Vcc−Vdelta), which is the expected result when no bootstrap capacitor faults exist. Therefore, in the corresponding LS-phase, LS-OK (452) is shown as a logic HIGH and indicates "no fault" in that LS-phase.

The signal values/states noted above hold true for other HS and LS phases, shown in FIG. 5A. Therefore, logic block 498 concludes, based on the logic HIGH levels of HS-OK and LS-OK, that a bootstrap capacitor fault does not exist, and accordingly de-asserts or maintains in the de-asserted state (logic-LOW) each of signals Cboot-Open (365) and Cboot-short (375).

Open:

FIG. 5B is a timing diagram (not to scale) illustrating the operation of fault-detector 350 in the situation when an "open" fault condition of bootstrap capacitor 224A-1 exists. FIG. 5B shows example waveforms of PWMA-1 (211), en-/LS (483), en-/HS (473), BOOTA-1 (215), SWA-1 (221), signals HS-OK (454) and LS-OK (452). It is assumed that the pre-determined number of cycles of blanking noted above have elapsed prior to time instant t521, and that signal rstb (497) has been de-asserted by delay block 495.

Time durations t521-t523, t525-t527 and t529-t531 depict HS-phase instances, i.e., durations in which HS switch 330 is ON (and LS switch 340 is OFF). Time durations t523-t525 and t527-t529 depict LS-phase instances, i.e., durations in which HS switch 330 is OFF (and LS switch 340 is ON). Thus, three cycles of PWMA-1 are shown in FIG. 5B.

In the HS-phase (HS is ON) in t521-t523, SWA-1 is at (Vcc−Vdelta−Vdelta2−Vt330) volts and BOOTA-1 is at (Vcc−Vdelta) volts, as may be verified from FIG. 3 given that the bootstrap capacitor is not present, or if present is in an 'open' condition. Vt330 represents the threshold voltage (Vt) of transistor 330. Vdelta2 is the voltage drop between power-supply terminal and output terminal of level-shifter 317 when level-shifter 317 drives transistor 330 (HS-switch) to ON condition. Therefore, [(BOOTA-1−SWA-1) would be equal to (Vdelta2+Vt330), which would be about 0.7 volts or so for silicon-based MOSFET. For other semiconductor materials, the threshold voltage may be slightly different from Si-based transistor. Hence, for the sake of simplicity, (BOOTA-1−SWA-1) is depicted/approximated as being 0V volts in HS phases in FIG. 5B, with both voltages BOOTA-1 and SWA-1 being depicted to be Vcc−Vdelta.

Due to voltage (Vdelta2+Vt330) between nodes BOOTA-1 and SWA-1, transistor 420 is OFF or weakly ON such that I3 of the current comparator of fault detector 350 of FIG. 4 has a magnitude of 0 A or a slightly larger value, but considerably less than I1. I2 continues to be (fixed level) at approximately I1/2, as noted above with reference to Equation 4. Therefore, I2 is substantially greater than I3. As a result, I2V converter 465 generates a logic LOW. Accordingly, HS-OK 454 is shown as a logic LOW (starting at t523 and considering interval t521-t523 to be the first HS-phase during current operation) and indicates a fault. It may be verified that HS-OK (454) would continue to remain at logic LOW thereafter. In the LS-phase occurring in interval t523-t525 SWA-1 is at 0 volts and BOOTA-1 is at (Vcc−Vdelta) volts, as may be verified from FIG. 3. (BOOTA-1−SWA-1) equals (Vcc−Vdelta). Therefore, I3 has a magnitude as noted above in Equation 3. I1 and I2 also continue to be at their fixed values. As a result, I3 is greater than I2, and I2V converter 465 generates a logic HIGH. Therefore, in the corresponding LS-phase, LS-OK (452) is shown as a logic HIGH and indicates "no fault" in that LS-phase.

The signal values/states noted above hold true for other HS and LS phases, as shown in FIG. 5B. Therefore, logic block 498 concludes, based on the logic LOW level of HS-OK and logic HIGH level of LS-OK, that an 'open' fault condition exists, and accordingly de-asserts or maintains in the de-asserted state (logic-LOW) signal Cboot-short (375), and asserts signal Cboot-Open (365) to logic HIGH.

Short:

FIG. 5C is a timing diagram (not to scale) illustrating the operation of fault-detector 350 in the situation when a 'short' condition between nodes BOOTA-1 and SWA-1 exists. Such an electrical short may be due to correctly connected, but shorted, bootstrap capacitor, or an electrical short due to some other cause irrespective of whether the bootstrap capacitor is shorted or not. FIG. 5C shows example waveforms of PWMA-1 (211), en-/LS (483), en-/HS (473), BOOTA-1 (215), SWA-1 (221), signals HS-OK (454) and LS-OK (452). It is assumed that the pre-determined number of cycles of blanking noted above have elapsed prior to time instant t541, and that signal rstb (497) has been de-asserted by delay block 495.

Time durations t541-t543, t545-t547 and t549-t551 depict HS-phase instances, i.e., durations in which HS switch 330 is ON (and LS switch 340 is OFF). Time durations t543-t545 and t547-t549 depict LS-phase instances, i.e., durations in which HS switch 330 is OFF (and LS switch 340 is ON). Thus, three cycles of PWMA-1 are shown in FIG. 5C.

When there is an electrical short between nodes BOOTA-1 and SWA-1, the voltage difference (BOOTA-1−SWA-1) is always zero, i.e., irrespective of whether it is an HS-phase or LS-phase. As shown in FIG. 5C, in the HS-phases, transistor 330 would be OFF since both power supply node and ground node of level-shifter 317 are at the same voltage (Vgs of transistor 330 would not exceed its threshold voltage). In the LS-phases, transistor 340 would be ON, and each of nodes BOOTA-1 and SWA-1 is at 0 volts.

Therefore, transistor 420 (FIG. 4) is always OFF, and node 411 is at or close to zero volts. As a result, I2V converter 465 generates a logic LOW, in HS as well as LS phases. Therefore, HS-OK (454) is shown de-asserted from t543 and LS-OK (452) is shown as de-asserted. Therefore, logic block 498 concludes, based on the logic LOW level of HS-OK and logic LOW level of LS-OK, that a 'short' exists, and accordingly de-asserts or maintains in the de-asserted state (logic-LOW) signal Cboot-Open (365), and asserts signal Cboot-short (375).

Thus, aspects of the present disclosure operate to handle connection faults of a bootstrap capacitor in a switching converter by detecting each of an open condition and a short condition of the bootstrap capacitor.

It is noted here that rather than implementing fault detector 350 to employ current-mode comparator as described in detail above, it is possible to employ voltage-mode comparators also, as would be apparent to one skilled in the relevant arts upon reading the disclosure herein. For example, multiple voltage comparators can be used to compare voltage difference (BOOTA-1−SWA-1) with the voltage difference (Vcc−Vdelta) or some other voltages. However, in general, such a voltage-mode comparison may require the (one or more) voltage comparator(s) to be capable of processing and/or tolerating very high voltages (such as 21V volts, 30V or greater). Further the power supply that would be needed for the voltage comparators may need to be much higher than the very high voltages noted above. Such an implementation may be more expensive, require larger implementation area and have more power consumption, which may not be desirable.

8. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1-4, although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

It should be appreciated that the specific type of transistors (such as NMOS, PMOS, etc.) noted above are merely by way of illustration. However, alternative embodiments using different configurations and transistors with similar characteristics will be apparent to one skilled in the relevant arts by reading the disclosure provided herein. Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A power stage of a voltage regulator comprising:
a high-side switch and a low-side switch coupled in series at a switching node, and together operable to generate an output voltage at an output node based on an input voltage received at an input node;
a bootstrap capacitor coupled to provide a gate drive for said high-side switch, said bootstrap capacitor coupled between a first node and said switching node in a no-fault condition of operation of said power stage, said first node being coupled to a power supply to provide power for charging said bootstrap capacitor; and
a fault-detector circuit for detecting each of an open condition of said bootstrap capacitor and a short condition of said bootstrap capacitor,
wherein said open condition comprises said bootstrap capacitor not being connected between said first node and said switching node,
wherein said short condition comprises said first node and said switching node being connected electrically with little or zero resistance.

2. The power stage of claim 1,
wherein said first node is a boot node coupled between said bootstrap capacitor and said power supply,
wherein a component external to said power stage receives indication of said open condition or said short condition detected by said fault-detector circuit and performs a fault-indicating action.

3. The power stage of claim 1, wherein said high-side switch and said low-side switch respectively provide said output voltage in a first phase and a second phase periodically based on a control signal received from said component, wherein said bootstrap capacitor is designed to be coupled between said first node and said switching node of said power stage, said fault-detector circuit comprises:
 a comparator circuit to compare a reference signal with either a first current or a first voltage, wherein said first current is a current generated based on a difference between respective voltages at said first node and said switching node, and wherein said first voltage is said difference, said comparator circuit generating a corresponding comparison result on a result node in each of said first phase and said second phase.

4. The power stage of claim 3, wherein said fault-detector circuit further comprises:
 a storage block to store said comparison result in each of said first phase and said second phase as a first-phase fault indicator and a second-phase fault indicator respectively; and
 a logic block to process said first-phase fault indicator and said second-phase fault indicator to determine whether either of said open condition and said short condition exists,
 wherein said logic block determines that:
  said open condition exists only if said first-phase fault indicator indicates a fault and said second-phase fault indicator indicates a no-fault,
  said short condition exists only if both of said first-phase fault indicator and said second-phase fault indicator indicate said fault, and
  neither one of said open condition and said short condition exists if each of said first-phase fault indicator and said second-phase fault indicator indicates said no-fault.

5. The power stage of claim 4, wherein:
 in said first phase, said control signal is a logic HIGH, said high-side switch is ON and said low-side switch is OFF, and
 in said second phase, said control signal is a logic LOW, said high-side switch is OFF and said low-side switch is ON.

6. The power stage of claim 5, wherein said reference signal is a first reference current and said either said first current or said first voltage is said first current.

7. The power stage of claim 5, wherein said reference signal is a first reference voltage and said either said first current or said first voltage is said first voltage.

8. The power stage of claim 6, wherein said comparator circuit comprises:
 a reference circuit comprising:
  a first circuit portion and a second circuit portion, wherein said first circuit portion is coupled to said second circuit portion via a first intermediate node, wherein said first circuit portion is coupled between said first node of said power supply and a first junction to source a third current into said first intermediate node, said third current being said first reference current, wherein said second circuit portion is designed to sink a fourth current from said first intermediate node, wherein said second circuit portion is a first constant-current sink to sink a first constant current from said first intermediate node, wherein said fourth current is said first constant current;
 a second constant-current sink to sink a second constant current from said first intermediate node such that said fourth current equals a difference between said third current and said second constant current;
 a current comparator comprising:
  a third circuit portion and a fourth circuit portion, wherein said third circuit portion is coupled to said fourth circuit portion via a second intermediate node, wherein said third circuit portion is designed to source said first current into said second intermediate node, wherein said fourth circuit portion is designed to sink a second current from said second intermediate node, wherein said fourth circuit portion is coupled to said second circuit portion in a current-mirror configuration to form a current-mirror such that said second constant current is a scaled version of said fourth current; and
 a current-to-voltage (I2V) converter coupled to receive a difference current from said second intermediate node, said difference current being the difference between said first current and said second current, said I2V converter to convert said difference current into a binary-logic-level voltage signal, wherein said binary-logic-level voltage signal is said comparison result.

9. The power stage of claim 8, wherein:
 said third circuit portion comprises a first resistor and a first transistor, wherein said first resistor is coupled between said first node and a first current terminal of said first transistor, wherein a control terminal of said first transistor is coupled to said switching node, and wherein a second current terminal of said first transistor is coupled to said second intermediate node; and
 said first circuit portion comprises a second resistor and a second transistor, wherein said second resistor is coupled between said power supply and a first current terminal of said second transistor, wherein a control terminal of said second transistor is coupled to a constant reference potential, and wherein a second current terminal of said second transistor is coupled to said first intermediate node.

10. The power stage of claim 9, wherein in said open condition:
 in each of a plurality of said first phases, a magnitude of said first current is less than a magnitude of said second current, thereby causing said I2V converter to generate said binary-logic-level voltage signal with a first logic-level and said first-phase fault indicator to indicate said fault; and
 in each of a plurality of said second phases, said magnitude of said first current is greater than said magnitude of said second current, thereby causing said I2V converter to generate said binary-logic-level voltage signal with a second logic-level and said second-phase fault indicator to indicate said no-fault.

11. The power stage of claim 10, wherein in said short condition:
 in each of a plurality of said first phases, a magnitude of said first current is less than a magnitude of said second current, thereby causing said I2V converter to generate said binary-logic-level voltage signal with said first logic-level and said first-phase fault indicator to indicate said fault; and
 in each of a plurality of said second phases, said magnitude of said first current is less than said magnitude of said second current, thereby causing said I2V converter to generate said binary-logic-level voltage signal with said first logic-level and said second-phase fault indicator to indicate said fault.

12. The power stage of claim 11, wherein said storage block comprises:
- a first flip-flop to store a logic level of said comparison result sampled at the end of said first phase as said first-phase fault indicator; and
- a second flip-flop to store a logic level of said comparison result sampled at the end of said second phase as said second-phase fault indicator.

13. The power stage of claim 12, wherein said fault-detector circuit further comprises a delay block to receive said control signal, and to generate upon power-ON of said power stage a blanking signal for a pre-determined number of cycles of said control signal, said blanking signal coupled to each of said first flip-flop and said second flip-flop to maintain each of said first flip-flop and said second flip-flop in reset.

14. A voltage regulator module (VRM) comprising:
- a phase controller to generate a regulated supply voltage on a first supply node based on an input voltage received at an input node; and
- a smart power stage (SPS) comprising:
    - a high-side switch and a low-side switch coupled in series at a switching node, and together operable to generate said regulated supply voltage;
    - a bootstrap capacitor coupled to provide a gate drive for said high-side switch, said bootstrap capacitor coupled between a first node and said switching node in a no-fault condition of operation of said power stage, said first node being coupled to a power supply to provide power for charging said bootstrap capacitor; and
    - a fault-detector circuit for detecting each of an open condition of said bootstrap capacitor and a short condition of said bootstrap capacitor,
    - wherein said open condition comprises said bootstrap capacitor not being connected between said first node and said switching node,
    - wherein said short condition comprises said first node and said switching node being connected electrically with little or zero resistance.

15. The VRM of claim 14,
- wherein said first node is a boot node coupled between said bootstrap capacitor and said power supply,
- wherein said phase controller receives indication of said open condition or said short condition detected by said fault-detector circuit and performs a fault-indicating action.

16. The VRM of claim 13, wherein said high-side switch and said low-side switch respectively provide said regulated supply voltage in a first phase and a second phase periodically based on a control signal received from said phase controller,
- wherein said bootstrap capacitor is designed to be coupled between said first node and said switching node of said SPS,
- wherein in said first phase, said control signal is a logic HIGH, said high-side switch is ON and said low-side switch is OFF,
- wherein in said second phase, said control signal is a logic LOW, said high-side switch is OFF and said low-side switch is ON, and
- wherein said fault-detector circuit comprises:
    - a comparator circuit to compare a reference signal with either a first current or a first voltage, wherein said first current is a current generated based on a difference between respective voltages at said first node and said switching node, and wherein said first voltage is said difference, said comparator circuit generating a corresponding comparison result on a result node in each of said first phase and said second phase.

17. The VRM of claim 16, wherein said fault-detector circuit further comprises:
- a storage block to store said comparison result in each of said first phase and said second phase as a first-phase fault indicator and a second-phase fault indicator respectively; and
- a logic block to process said first-phase fault indicator and said second-phase fault indicator to determine whether either of said open condition and said short condition exists,
- wherein said logic block determines that:
    - said open condition exists only if said first-phase fault indicator indicates a fault and said second-phase fault indicator indicates a no-fault,
    - said short condition exists only if both of said first-phase fault indicator and said second-phase fault indicator indicate said fault, and
    - neither one of said open condition and said short condition exists if each of said first-phase fault indicator and said second-phase fault indicator indicates said no-fault.

18. The VRM of claim 17, wherein said reference signal is a first reference current and said either said first current or said first voltage is said first current.

19. The VRM of claim 17, wherein said reference signal is a first reference voltage and said either said first current or said first voltage is said first voltage.

20. The VRM of claim 18, wherein said comparator circuit comprises:
- a reference circuit to generate said first reference current;
- a current comparator configured in a current-mirror configuration and designed to source said first current, to sink a second current and to generate a difference current, said difference current being the difference between said first current and said second current; and
- a current-to-voltage (I2V) converter coupled to receive said difference current, said I2V converter to convert said difference current into a binary-logic-level voltage signal, wherein said binary-logic-level voltage signal is said comparison result,
- wherein in said open condition:
    - in each of a plurality of said first phases, a magnitude of said first current is less than a magnitude of said second current, thereby causing said I2V converter to generate said binary-logic-level voltage signal with a first logic-level and said first-phase fault indicator to indicate said fault; and
    - in each of a plurality of said second phases, said magnitude of said first current is greater than said magnitude of said second current, thereby causing said I2V converter to generate said binary-logic-level voltage signal with a second logic-level and said second-phase fault indicator to indicate said no-fault,
- wherein in said short condition:
    - in each of a plurality of said first phases, a magnitude of said first current is less than a magnitude of said second current, thereby causing said I2V converter to generate said binary-logic-level voltage signal with said first logic-level and said first-phase fault indicator to indicate said fault; and
    - in each of a plurality of said second phases, said magnitude of said first current is less than said magnitude of said second current, thereby causing said I2V converter to generate said binary-logic-level voltage signal with said first logic-level and said second-phase fault indicator to indicate said fault.

\* \* \* \* \*